US012696852B2

(12) United States Patent
Knoche et al.

(10) Patent No.: US 12,696,852 B2
(45) Date of Patent: Aug. 4, 2026

(54) PLANT FOR THE PRODUCTION OF ELECTRICAL ENERGY LOCATED ON AGRICULTURAL LAND WITH MONITORING OF CROPS ON THAT LAND

(71) Applicant: REM TEC S.R.L., Asola (IT)

(72) Inventors: Ronald Knoche, Garches (FR); Giancarlo Ghidesi, Asola (IT)

(73) Assignee: REM TEC S.R.L., Asola (IT)

( * ) Notice: Subject to any disclaimer, the term of this patent is extended or adjusted under 35 U.S.C. 154(b) by 0 days.

(21) Appl. No.: 18/996,974

(22) PCT Filed: Aug. 31, 2023

(86) PCT No.: PCT/IB2023/058622
§ 371 (c)(1),
(2) Date: Jan. 17, 2025

(87) PCT Pub. No.: WO2024/047577
PCT Pub. Date: Mar. 7, 2024

(65) Prior Publication Data
US 2026/0033438 A1     Feb. 5, 2026

(30) Foreign Application Priority Data

Aug. 31, 2022     (IT) ........................ 102022000017877

(51) Int. Cl.
A01G 9/24          (2006.01)
A01G 9/22          (2006.01)
(Continued)

(52) U.S. Cl.
CPC .............. A01G 9/243 (2013.01); A01G 9/22 (2013.01); F24S 30/425 (2018.05); *F24S 2030/11* (2018.05)

(58) Field of Classification Search
CPC ........ A01G 13/21; A01G 13/29; A01G 13/26; A01G 9/22; A01G 9/243
See application file for complete search history.

(56) References Cited

U.S. PATENT DOCUMENTS 8,418,401 B2 *   4/2013   Chuang .................. H02S 20/23
                                                        47/17
9,851,544 B2 *   12/2017   von Behrens ........... F24S 90/00
(Continued)

FOREIGN PATENT DOCUMENTS

CN          107711190 A  *  2/2018   ............... A01G 9/14
EP          0371000 A1  *  5/1990   ............. A01G 9/243
(Continued)

OTHER PUBLICATIONS

Dupraz, et al.; "Combining solar photovoltaic panels and food crops for optimising land use: Towards new agrivoltaic schemes"; Renewable Energy, Pergamon Press, Great Britain; Mar. 11, 2011.
(Continued)

*Primary Examiner* — Monica L Perry
(74) *Attorney, Agent, or Firm* — Dickinson Wright PLLC; Andrew D. Dorisio

(57)          ABSTRACT

Plant for the production of electrical energy comprising a support structure formed by support poles (2) aligned along a first axis (X) fixed to the ground, said structure being configured with a plurality of parallel rows (Fi) of such poles (2) with any orientation, resulting in the formation of a two-dimensional structure along said axis (X) and a second axis (Y) differently oriented with respect to the first, said structure being installed on an agricultural land (T), and the distance between the support poles, along both axes (X, Y) is such as to allow the passage and processing of the land by agricultural vehicles or vehicles. On said support structure and in particular on rows of poles being positioned devices for generating electrical energy and systems for the move-
(Continued)

ment or orientation of such generating devices. The plant comprises means for controlling the growth of the crops underlying the plant.

22 Claims, 7 Drawing Sheets

(51) Int. Cl.
  *F24S 30/425* (2018.01)
  *F24S 30/00* (2018.01)

(56) References Cited

U.S. PATENT DOCUMENTS

| | | | | |
|---|---|---|---|---|
| 10,852,039 | B2 * | 12/2020 | Saeed | A01G 9/243 |
| 2005/0109384 | A1 * | 5/2005 | Shingleton | F24S 10/00 |
| | | | | 136/244 |
| 2010/0263660 | A1 | 10/2010 | Thorne | |
| 2016/0073591 | A1 * | 3/2016 | Surany | H02S 30/20 |
| | | | | 126/627 |
| 2016/0282015 | A1 * | 9/2016 | Courtemanche | F24S 20/61 |
| 2017/0194894 | A1 | 7/2017 | Conger | |
| 2019/0159407 | A1 | 5/2019 | Surany | |
| 2020/0059193 | A1 * | 2/2020 | Sgarrella | H02S 20/32 |
| 2020/0195192 | A1 * | 6/2020 | Sk | H02S 30/10 |
| 2020/0329647 | A1 | 10/2020 | Knoche | |
| 2021/0006201 | A1 * | 1/2021 | Hinson | F24S 50/20 |
| 2021/0135618 | A1 * | 5/2021 | Pierobon | F24S 30/425 |
| 2022/0151163 | A1 * | 5/2022 | Agrawal | A01G 9/243 |
| 2024/0235462 | A1 * | 7/2024 | Fisher | A01G 9/243 |

FOREIGN PATENT DOCUMENTS

| | | | | | |
|---|---|---|---|---|---|
| EP | | 2811819 | B1 * | 9/2016 | F24S 30/425 |
| EP | | 3122172 | A1 | 2/2017 | |
| FR | | 2949039 | A1 * | 2/2011 | A01G 9/243 |
| JP | | 5898563 | | 4/2016 | |
| KR | 20210097860 | | | 8/2021 | |
| WO | | 2010103378 | A1 | 9/2010 | |
| WO | | 2013076573 | A1 | 5/2013 | |

OTHER PUBLICATIONS

Marrou, et al.; "Microclimate under agrivoltaic systems: Is crop growth rate affected in the partial shade of solar panels"; Agricultural and Forest Meteorology, Elsevier; Netherlands; May 20, 2013.
Marrou, et al.; "Productivity and radiation use efficiency of lettuces grown in the partial shade of photvoltaic panels"; European Journal of Agronomy; Dec. 31, 2013.

* cited by examiner

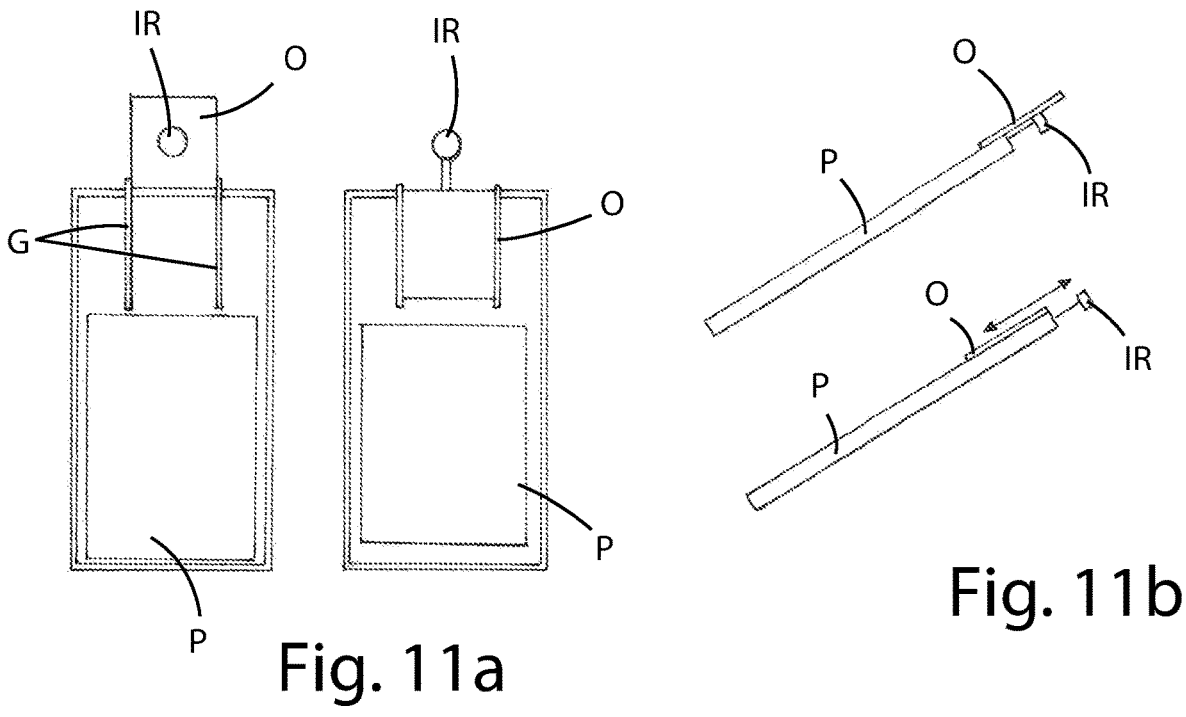
Fig. 11a
Fig. 11b
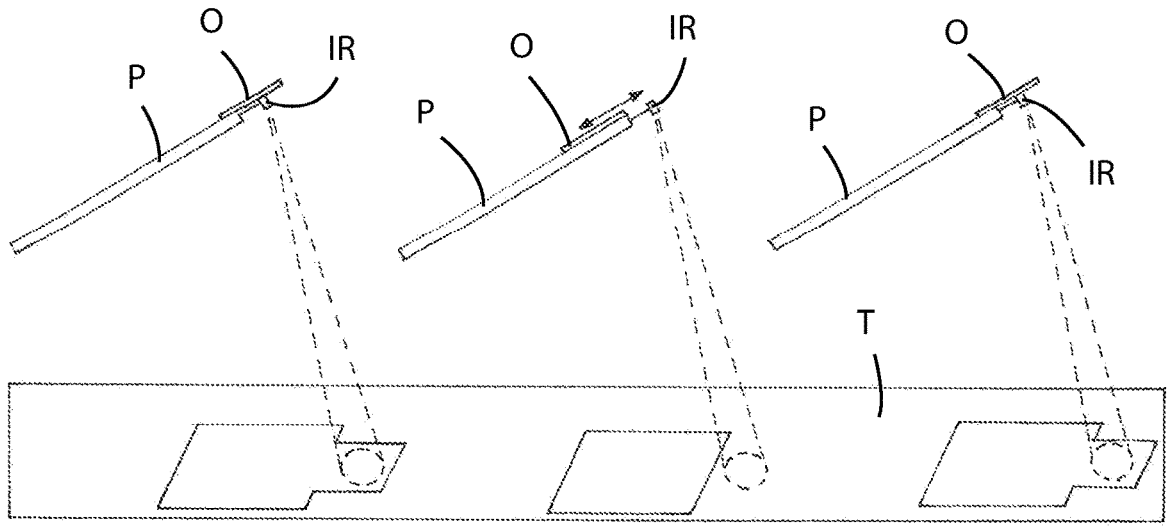
Fig. 12

PLANT FOR THE PRODUCTION OF ELECTRICAL ENERGY LOCATED ON AGRICULTURAL LAND WITH MONITORING OF CROPS ON THAT LAND

TECHNICAL FIELD

The present invention refers to a plant for the production of solar and/or wind electrical energy formed by a support structure elevated and positioned on an agricultural land, suitable for supporting devices suitable for receiving solar light, for example photovoltaic panels and/or wind modules.

Such plant is installable on agricultural lands, leaving the possibility to use such land for the original purposes, i.e., for cultivating vegetables, cereals, or for grazing animals.

The plant comprises a tensile structure forming the elevated support structure for said devices.

Background

The patent application US2017194894A1 describes various types of solar plants in which the photovoltaic panels are supported by tensile structures.

Underlying such plant, agricultural installations can be also obtained.

For the purposes of the present invention, tensile structure means a structure made of materials kept in position by tension.

Systems for moving solar panels on two axes, slangly referred to as "sun seekers," are further known.

Such a type of sun seeker is shown in the patent application WO2010103378 describing a bearing structure formed by support poles kept in position by a lattice of tie rods, both the support poles and the tie rods are fixed in the ground by means of a hinge pin.

The sun seeker comprises a bearing horizontal main profile, which can rotate around its own axis, to which a plurality of secondary profiles, perpendicularly fixed to the main profile and which can be rotated around their own axis, are connected. The solar panels are fixed on such secondary profiles. The ends of the main profile of the seeker are rested and fixed on support profiles.

Patent WO2013076573 describes a structure of pilings for supporting of such a type which also supports wind modules. Said structure is made as a two-dimensional "chessboard" structure and can be installed also on agricultural lands as it is elevated and the distance between the support poles is such as to allow the passage of even huge agricultural vehicles.

A photovoltaic plant is described in patent application WO2019049094, where greenhouses for cultivating vegetables are positioned on the ground on which such plant is installed. The electrical energy produced by the plant is also used for powering devices suitable for managing the crops (for example, irrigators, environmental sensors placed inside and outside the greenhouse).

Summary

The Applicant observed that monitoring and consequently managing the growth of agricultural crops on the ground underlying the support structure of the plant is an important problem. In particular, in addition to monitoring the environmental conditions of the ground and the air (for example, temperature, humidity, etc.), directly controlling the growth of the plants is essential.

An aspect of the present invention relates to a plant for the production of electrical energy positioned on an agricultural land in which means for controlling the growth and state of the crops underlying the plant itself are provided.

An aspect of the present invention relates to a plant for the production of electrical energy positioned on an agricultural land having the features of the attached claim 1.

Further features of the present invention are contained in the dependent claims.

BRIEF DESCRIPTION OF THE DRAWINGS

The features and advantages of the present invention will be more apparent from the following description of an exemplary and non-limiting embodiment of the invention, referred to the attached schematic drawings, in which:

FIG. 11a schematically illustrates the devices suitable for measuring the shading of the crops with respect to the ground according to the present invention associated with a panel (in a top view) of the plant of FIG. 1;

FIG. 11b is a side view of FIG. 11a;

FIG. 12 shows the devices of FIGS. 11a and 11b in operating conditions on the ground;

DETAILED DESCRIPTION

Figure 1:
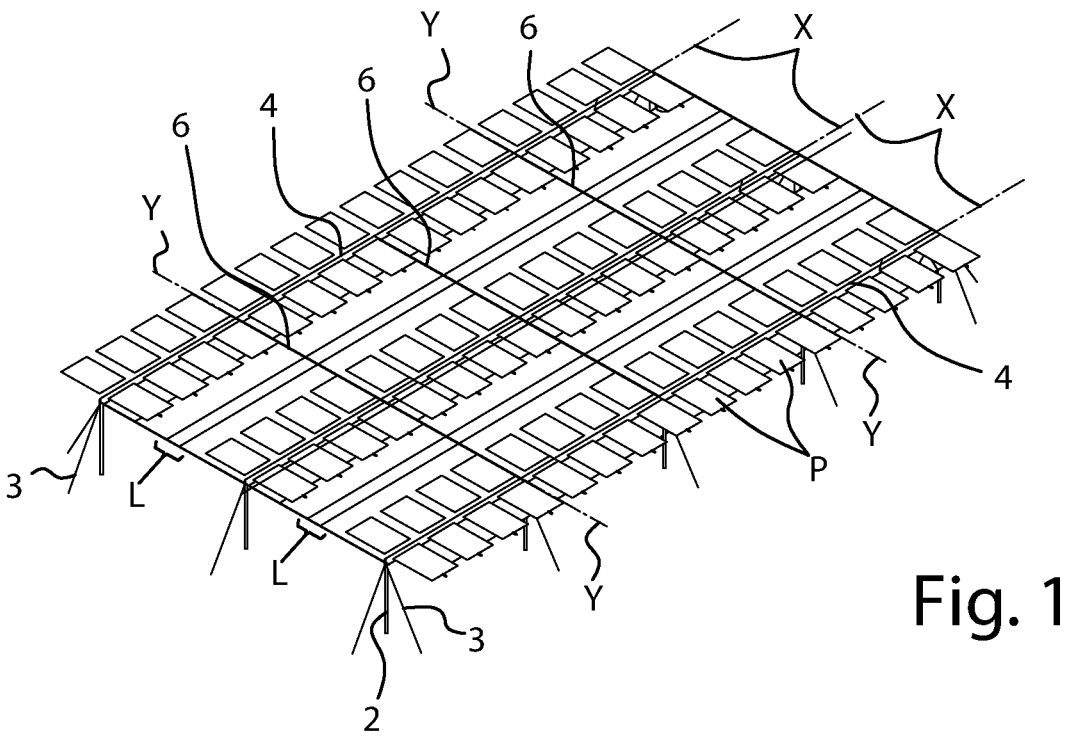
FIG. 1 illustrates an exemplary perspective view of a photovoltaic plant with sun seekers.
Figure 2:
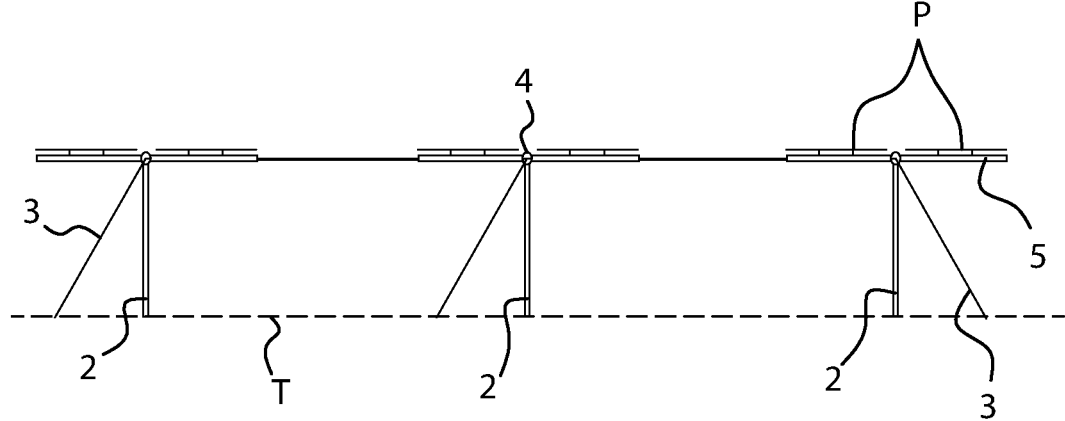
FIG. 2 illustrates a front view of the plant of FIG. 1.
Figure 3:
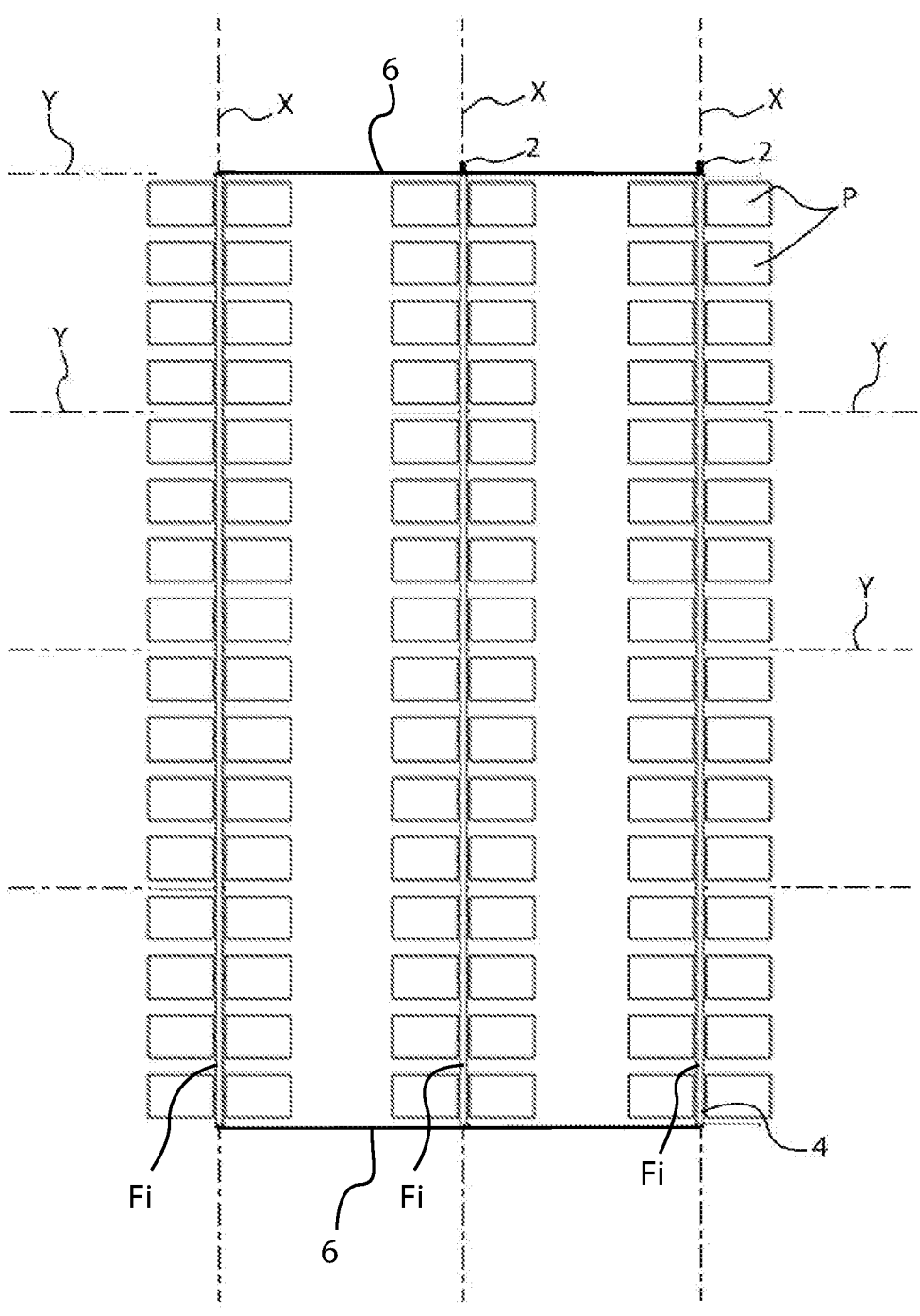
FIG. 3 illustrates a top view of the plant of FIG. 1.

With reference to the cited figures, the plant for the production of electrical energy according to the present invention essentially comprises a support structure formed by support poles 2 preferably kept in position by a lattice of tie rods or profiles for connecting the poles 3. Both the support poles and the tie rods are fixed in the ground by means of suitable connections, for example hinge pins in the case of a tensile structure. Said structure can be advantageously configured with a plurality of parallel rows Fi of poles, each row having the poles aligned along a first axis X with any orientation. The parallel rows of poles result in the formation of a two-dimensional structure along said axis X and a second axis Y preferably but not exclusively orthogonal with respect to the first to form a "chessboard" structure, which can be installed on agricultural lands, as it is elevated and the distance between the support poles (along both axes X and Y) is such as to allow the passage of even huge agricultural vehicles.

Such support structure can be alternatively made by means of piling in concrete poles, which will have a portion inserted in the ground and a part above ground suitable for conferring to the structure the suitable height from the ground. Said piling can or cannot be connected by steel bars or tie rods.

On said support structure and in particular on rows of poles, devices for generating electrical energy such as devices suitable for receiving solar light, for example photovoltaic panels, are positioned.

Preferably, systems for the movement or orientation of such devices are arranged on said support structure. Wind devices can be further positioned in addition to or for replacing such solar devices on top of such poles.

The movement system allows the movement (in particular the rotation) on the first axis X and also on the second axis Y of the devices suitable for receiving solar light, to allow them to keep the desired and correct orientation towards the sun.

Each movement system comprises a rotating main profile 4 around its own axis, and arranged in operation substantially horizontally, to which a plurality of secondary profiles 5, preferably perpendicularly fixed to the main profile in a rigid manner or alternatively by means of suitable systems suitable for conferring its rotation capacity, are connected. The generating devices, in the illustrated specific case the photovoltaic panels P, are fixed on such secondary profiles.

The movement system further comprises a movement mechanism for the primary profiles and optionally also a movement mechanism for the secondary profiles.

Obviously, the materials for the various parts were suitably selected for a correct balance between weights and strength.

The movements of the motors which allow the aforementioned rotations around the axes X and Y are controlled by a dedicated electronic processing unit which determines the angle that the panels must present throughout the day and in all climatic conditions, with retroaction by a dedicated tilt sensor. Being such system capable of moving the panels according to the first axis X and also to the second axis Y, the movement or orientation of solar devices is always possible, regardless of the arrangement of the system itself on the ground.

According to the present invention, agricultural crops, comprising crops on the ground T underlying the plant, are present below such support structure.

The electronic processing unit, by means of the movement of the receiving devices, regulates the shade generated on the ground as a function of the need for direct light, in order to optimize the development or growth thereof, of such crops, also considering other parameters such as temperature and humidity of the ground.

According to the present invention the plant comprises means for controlling the growth and state of the crops underlying the plant itself.

Such means comprise, in a first embodiment devices suitable for measuring the height and density of the crops with respect to the ground.

Obviously, the present invention is applicable to all the crops for which the measure of the height from the ground T thereof is a reliable index for checking their growth.

Such means comprise, in a second embodiment, devices suitable for measuring the fluorescence emitted by the aforementioned crops.

In a third embodiment, such means comprise devices for generating quick shading variations in a specific zone of the cultivated land and devices suitable for measuring the temperature variations in such specific zone.

In a further embodiment, the measurements between the first, second, and third embodiment are combined to each other in order to check the growth and state of the crops.

According to the present invention, such devices suitable for measuring the height and density of the crops with respect to the ground comprise a plurality of laser rangefinders associated with devices for scanning the rays emitted by such rangefinder, arranged at a predetermined height and in a predetermined position with respect to the ground where the plant is installed and where the crops to be monitored are present.

The laser rangefinder is a high-accuracy instrument for measuring distances between two points, whose operation is based on emitting a low energy laser ray. At the moment when it is activated, the rangefinder emits a laser ray. An electronic chronometer integrated in the device measures the time between the emission and the return of the reflected ray. Knowing the speed of light in the air, the distance travelled by the laser ray can be immediately calculated, through the simple equation: distance=speed×time. In this way, correctly addressing the ray on a specific target, its distance from the emitting device can be measured.

A number of successful applications in the field of silviculture for phenotyping plants already exist. However, airborne laser scanners, for example associated with drones, are characterized by high cost, while terrestrial laser scanners are considered to be impractical for operation and use.

The scanning device allows to move the laser ray along the directions (X and Y) making a scanning of the ground and thus of the crops.

Figure 4:
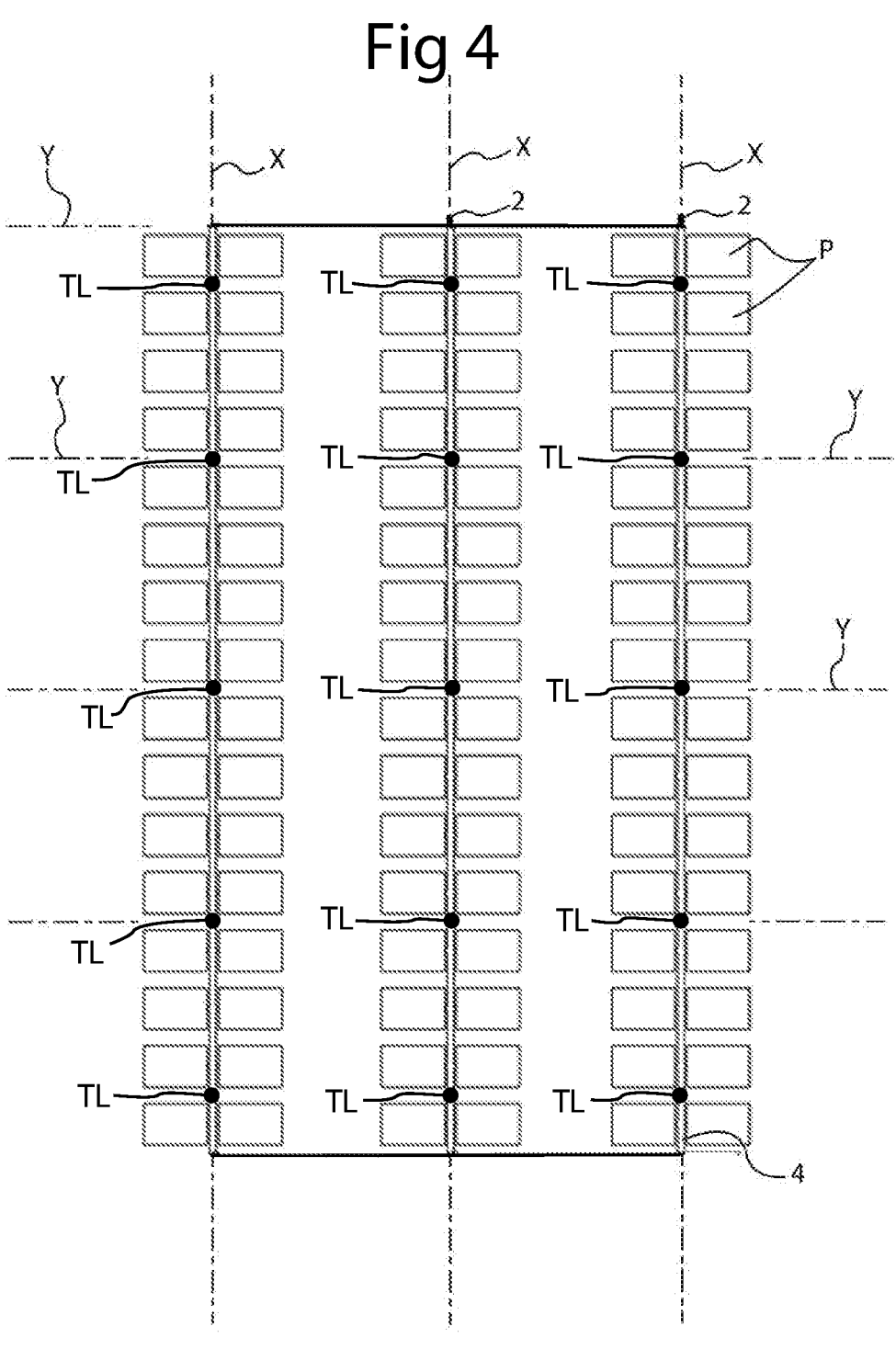
FIG. 4 illustrates a top view of the plant of FIG. 1 provided with means for controlling the growth of the crops underlying the plant itself according to the present invention.
Figures 5, 6, 7, 8:
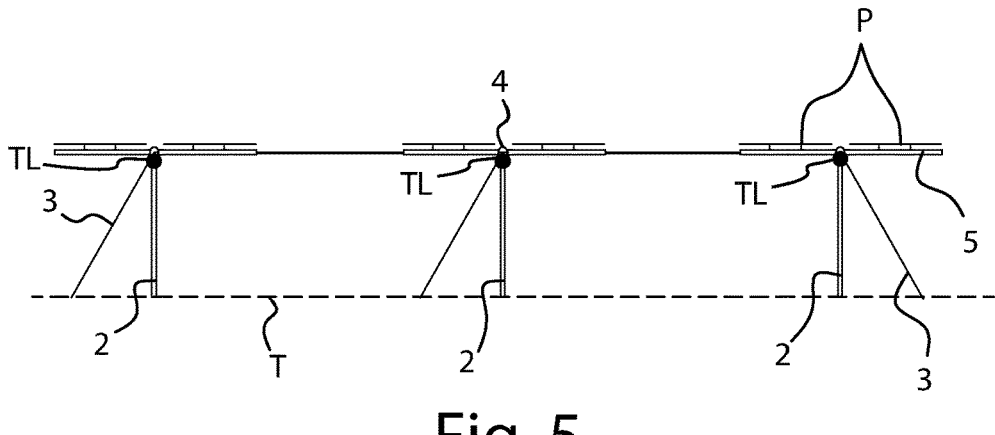
FIG. 5 illustrates a front view of the plant of FIG. 4.
FIG. 6 schematically illustrates devices suitable for measuring the height of the crops with respect to the ground according to the present invention.
FIG. 7 illustrates an example of a graph for detecting such devices of FIG. 6.
FIG. 8 illustrates an example of a graph for estimating parameters based on the detections of such devices.

As illustrated in particular in FIGS. 4 and 5, a plurality of laser rangefinders are installed in a predetermined position TL in the plant, so as to monitor substantially the entire surface of the ground.

The rangefinder is rotated as indicated by the coloured arrow in FIG. 5. The acquisition of the signal of "distance" between the rangefinder TL and a target is made at a high frequency (e.g., 10 Hz), so as to have multiple distances measured in each second (frequency >10 Hz). Considering the "point-shaped" nature of the laser signal, each pulse has a certain probability to reach the surface of the ground T (corresponding to line RT) or impact on the most elevated parts of the vegetal formation (corresponding to line RC). Therefore, from the set of acquired signals, two curves representing the distance between the rangefinder TL and the soil (CRT) and between the rangefinder TL and the top of the cultivation (CRC) can be extrapolated. Therefore, the difference of these two distance values (C) corresponds to the height of the cultivation. Its density can be further determined.

Advantageously, the scanning device of the laser rangefinder coincides with the system for moving the photovoltaic panels, which allows the movement (in particular the rotation) on the first axis X and/or also on the second axis Y of the laser rangefinder. In practice, each laser rangefinder is installed on a predetermined panel (P), so that the laser points downward, towards the ground.

Alternatively, the scanning device of the laser rangefinder can be positioned on a stand-alone structure in the plant.

Advantageously, part of the energy generated by the plant can be used to power the laser rangefinders and/or scanning devices.

The scanning of the laser is thus obtained making the panels suitably move, for example at night for minimizing interference by solar light and possible aberrating reflections, as well as losses deriving from the imperfect orientation with respect to the sun. The operating principle for each scanning operation can be for example as follows:

starting the movement system and simultaneously starting the rangefinder with data acquisition;

setting the standard path of the panel so as to maximize the area explored by the rangefinder;

ending the operation and returning to resting state;

transferring data to processing system;

calculating the average height of the plants and the density of the points detected by the rangefinder.

Allometric models can be applied on the detected points (example in FIG. 8) for estimating ponderal parameters (dry biomass), from data of height and density of points. In such graphs, the growth (height) of the plants is related to the weight of some identified vegetal truths.

Furthermore, a scoring evaluation can be performed on the state of the cultivation such as deviation percentiles from an average curve of increasing of the specific cultivation raised in a specific environment or, alternatively, with a statistical model.

The scanning operation can be programmed at variable intervals depending on the typology of cultivation or farming and on the development stages of the plants. On average, for example, a weekly scanning will allow to construct a very accurate curve of the average height of the cultivation.

Advantageously, the electronic processing unit of the photovoltaic plant also controls and commands the devices suitable for measuring the height of the crops with respect to the ground.

In the second embodiment, a feature of the vegetation which emits fluorescence following the excitation of the Light Harvesting Complex (LHC), which is present in all the higher plants, is used. The operating principle is based on the fact that the quantity of light emitted as fluorescence from the vegetation in the spectral range comprised between 650 and 780 nm, is proportional to the illumination intensity in the bands for absorbing chlorophyll (400-700 nm) and to the quantity.

In such second embodiment, the devices suitable for measuring the fluorescence emitted by the crops comprise at least one illumination source for the crops and at least one sensor (for example of the CCD type) for detecting the fluorescence induced on the plants by such type of illumination. Such light source emits light radiations preferably comprised between 400 and 650 nm.

Preferably, such means for detecting the fluorescence are associated with a plurality of panels P of the plant (suitably selected in a number such as to monitor the entire ground underlying the plant itself). For example, such detection means are associated with the system for moving the panels themselves.

Figure 9:
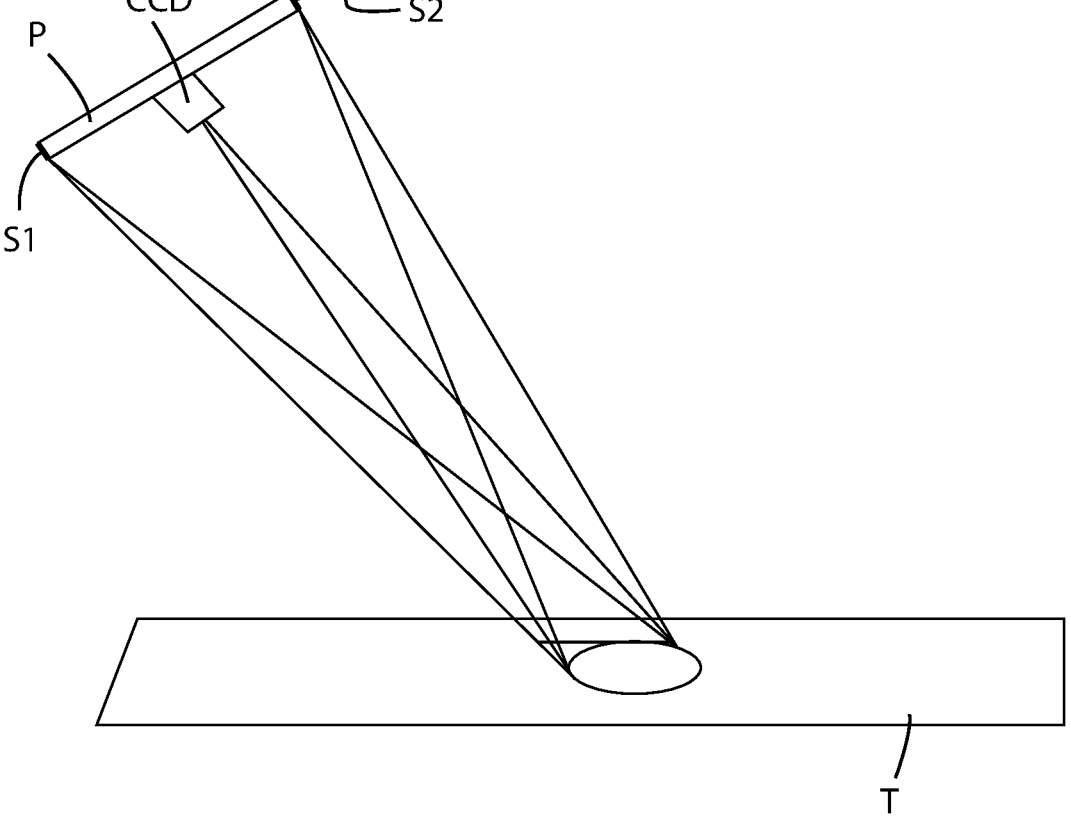
FIG. 9 schematically illustrates devices suitable for measuring the fluorescence of the crops with respect to the ground according to the present invention.

In the second embodiment illustrated in FIG. 9, the illumination sources are two, S1 and S2, associated with the sides of a photovoltaic panel of the plant in a lighting direction which forms an angle with the ground which varies also as a function of its distance from the ground itself.

Advantageously, the electronic processing unit of the photovoltaic plant also controls and commands the devices for detecting the fluorescence.

The detection sensors are provided with a high-pass filter, which allows the detection of photons at wavelengths higher than 680 nm. Due to this filter, the sensor measures the integral of the emitted fluorescence integrating all the emission spectrum and the two emission peaks of chlorophyll in the frequencies of red (680 nm) and infrared (760 nm). The measure is made at the end of the more dynamic step of the vegetation response when the fluorescence reaches a stationary state (steady-state). This implies that the acquisition system is provided with a processor capable of calculating the instantaneous variation of the fluorescence and identifying the stationary state with absolute certainty.

When such means for detecting the fluorescence (illumination sources and sensors) are associated with the panels, they use the movement of the panels themselves on the first axis X and/or also on the second axis Y for "brushing" the ground where the crops are present.

Alternatively, such means for detecting the fluorescence can be positioned on a stand-alone structure in the plant or can be positioned on aircrafts (such as for example drones) which fly over an agricultural land, or vehicles which pass through the land itself.

In such manner, a system (stand-alone, even independent of a photovoltaic plant) for monitoring the growth of the crops in an agricultural land which comprises means for detecting the fluorescence of the aforementioned crops comprising at least one illumination source for the crops and at least one sensor (for example of the CCD type) for detecting the fluorescence induced on the plants by such type of illumination, is generated.

Advantageously, the electronic processing unit of the photovoltaic plant also controls and commands the devices suitable for measuring the fluorescence of the crops.

The described system allows to automatically make relative measures of the quantity of vegetal biomass which is below the measure system positioned on the agrivoltaic system. At time TO, i.e., before the cultivation, when the soil is bare, the signal of fluorescence will be equal to zero. As the cultivation will increase, there will be an increase of the signal which will be proportional to the leaf surface directly and/or indirectly illuminated by the light sources S1 and S2. The user will receive quantitative information about the relative increasing curve of the cultivation.

Such third embodiment is based on the concept that the water deficit in the soil induces a typical response in the vegetation: the plants not having a sufficient water supply able to balance the transpiration requirement of the atmosphere acuate a number of strategies to reduce the transpiration and thus keep a sufficient level of cellular turgor which prevents damage to the protein complexes, which are at the base of the functions of acquisition of carbon from the atmosphere (photosynthesis) and organication thereof. A part of these strategies tends to reduce the absorption of light by photosynthetic organs of the plans, and a part tends to increase the resistance against transport of the water from the plant to the atmosphere. This second group of strategies is based on the capacity of the plants of regulating the opening of the stomata, which are the main channel for the gas exchanges which occur between vegetation and atmosphere. Stomata are small regulatable openings which are for most distributed in the leaves and often in a different manner between the upper and lower blades of the leaves. They consist of a pair of cells, referred to as "guard cells," which, by modifying their turgor level, open or close the opening which connects the mesophyll (the innermost part of the leaf) and the atmosphere. The input of atmospheric carbon dioxide, or the essential substrate of the photosynthesis, occurs through the stomatal way, as well as water vapour is released from the inside of the plant to the outside through the stomata. When the stomata are "open," the acquisition of $CO_2$ in the mesophyll is not limited, as well as the loss of water vapour by the plant (transpiration). The transpiration, in turn, is one of the essential mechanisms for thermally regulating the plants; the state passage of water from liquid to vapour is a process which absorbs energy and thus reduces the temperature of the surface on which such process occurs.

Therefore, it is inevitable that a plant not having severe limitations in water transport in the vascular system and has a high stomatal conductance (g=1/r where g and r are stomatal resistance and conductance, respectively) is "colder" than a plant in which the water transport is subjected to a severe limitation. However, the absolute temperature of a plant is not a perfect indicator of the water status thereof, as it depends, in addition to the capacity of transport, on the quantity of energy being absorbed by the plant (irradiance and optical features of the surfaces), as well as on a complex system of resistances which depend on the environmental conditions (temperature of the air, speed of the wind, intensity of the turbulence, atmospheric humidity) which define the vapour pressure deficit (VPD) at the interface between plants and atmosphere.

In such third embodiment, the water status of the vegetation is estimated not through the measure of the absolute value of the temperature of the vegetation, but through the speed at which a plant adapted to shaded conditions will be heated in the transition between shade and light conditions. The assumption is that a reduced stomatal conductance, caused by a situation of water deficit of the soil, not allowing a quick "cooling" of the vegetal surface following the latter, will determine a heating rate higher than that of a vegetal surface which has instead access to sufficient water resources in the ground.

Figure 10:
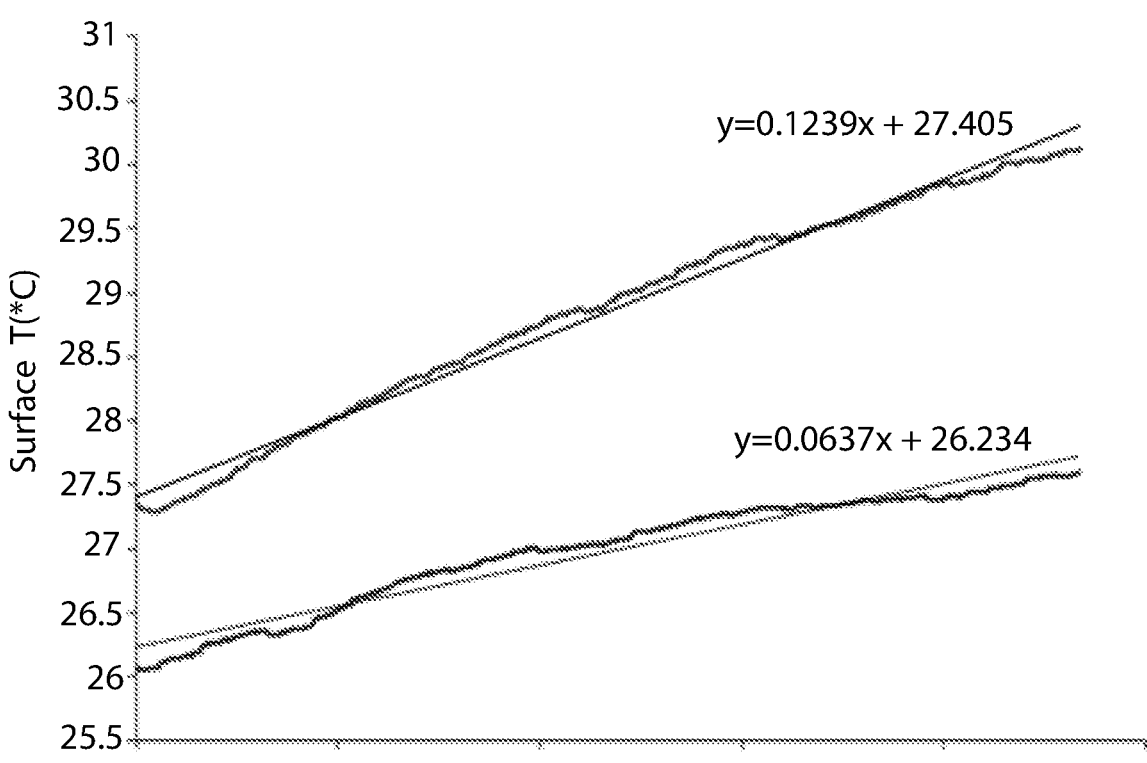
FIG. 10 shows a graph of the surface temperature variation of lettuce plants under water stress conditions, and abundantly-irrigated plants in a transition between shade and light conditions.

The graph of FIG. 10 shows merely by way of example the variation of the temperature of the surface of lettuce plants exposed to different irrigation volumes. The (upper) red line represents the surface temperature variation of lettuce plants under water stress conditions, as the (lower) blue line refers to abundantly irrigated plants. The transition between shade/light conditions has occurred at time zero, indicated on the X axis.

At time To, the plants which remained in the shade for 15 minutes (PAR=200 umol m-2 s-1) were exposed to solar light (about 1200 μmol m-2 s-1) and the instantaneous surface temperature variation was measured by IR camera (FLIR, emissivity [?]=0.97). The heating rate (dT/dt=0.12° C. s-1) of the plants in which a water stress is present was practically twice that of the plants in which a wide water availability was provided through abundant irrigation levels (dT/dt=0.06° C. s-1)

In such third embodiment, the devices for generating shading in a specific zone of the cultivated land comprise at least one movable shading plate O, so as to be able to shade (obscure) a specific cultivation zone.

The devices suitable for measuring the temperature variations in such specific zone comprise at least one temperature sensor IR suitable for measuring in such zone and at least one sensor of radiation reflected from such zone and at least one sensor of solar radiation.

Advantageously, the devices for generating shading are associated with one or more panels P of the plant (suitably selected to cover the entire ground underlying the plant itself). For example, such shading devices are associated with the system for moving the panels themselves, so as to direct the shade formed by the plate using the movement of the panels and perform multiple measurements in different points with the same device.

Preferably, such plate is associated with an edge of such panel P.

Such plate slides between a pair of guides G obtained on the panel and is moved by a suitable actuator. Advantageously, the temperature sensor (for example an infrared sensor IR) is positioned in proximity to the plate O.

Alternatively, such system for shading and detecting can be positioned on a stand-alone structure in the plant or on aircrafts (such as for example drones) which fly over an agricultural land, or vehicles which pass through the land itself.

Advantageously, the electronic processing unit of the photovoltaic plant controls and commands the devices for generating shading in a specific zone of the cultivated land and the devices suitable for measuring the temperature variations in such specific zone.

Such device operates as follows.

The measures are performed when the environmental conditions are favourable, or there is a sufficiently long solar illumination period (for example longer than 15 minutes) at low variability (absence of clouds) or other sensors (for example a webcam) reveal the existence of favourable conditions and give the consent.

The measurement cycle is thus advantageously remotely activated at the same time on all the sensors installed in the network of the plant. It provides a period for measuring the target framed by the sensors of temperature and reflected light when such target zone in shaded (for example for a duration of 10 sec.).

After this step, the shading plate is actuated and quickly retracts determining a sudden increase in the illumination of the target zones, as illustrated in FIG. 12.

Figure 13:
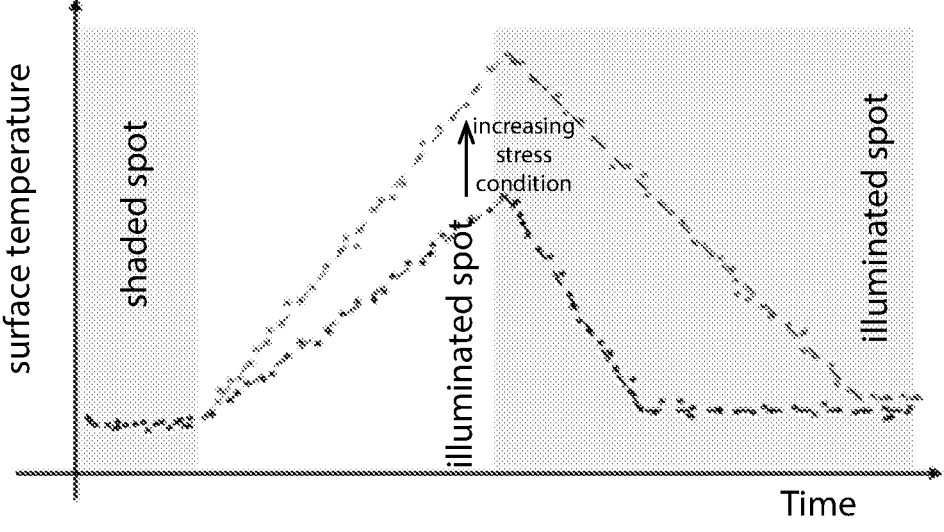
FIG. 13 shows respective graphs of the temperature on a plant under water stress conditions and irrigated, in transition between shade/light/shade.

The sensors of temperature and reflected light acquire data for a period of about 30 s, at the end of which the shading plate is actuated again to return in the initial position. The data acquisition continues even after the light/shade transition for a period of about 120 s. The measure step is schematized in FIG. 13.

All the acquired data are thus processed for estimating:
1) the reflectance in the band of the NIR (near infrared region), calculated as the ratio of the light incident to the sensor of solar and reflected light. This quantity is important in order to determine the degree of covering of the soil and the estimable fraction of light absorbed by the cultivation (APAR).
2) The temperature variation of the cultivation between the moment of transition between shade and light divided by the measure time (dTOL/dt, 30 s)
3) The temperature variation of the cultivation between the next moment of transition between light and shade for the measure time (dTLO/dt, 120 s) Such information allows to map the dTOL/dt and dTLO/dt values on the entire plant and to identify the areas where the average overall water status of the cultivation is and possible spatial differences of the water deficit conditions. These are elements which can guide to a rational use of the irrigation water, possibly by also dividing the irrigation interventions to limit them to the higher deficit zones.

The invention claimed is:
1. A plant for the production of electrical energy comprising:
   a support structure comprising support poles aligned along a first axis fixed to the ground, said support structure further comprising a plurality of parallel rows of said support poles, such that the plurality of parallel rows of the support poles form a two-dimensional structure along said first axis and a second axis differently oriented with respect to the first axis, wherein said support structure is adapted for installation on an agricultural land, and the support poles are spaced at a distance along both the first axis and the second axis, wherein electricity generation devices are positioned on said support structure, wherein said support structure comprises a plurality of movement systems configured to move or orient the electricity generation devices, the plurality of movement systems each further including an electronic processing unit adapted to determine an angle of a plurality of panels associated with the electricity generation devices, and wherein the plant includes means to control the growth and state of the crops underlying the plant.

2. The plant according to claim 1, wherein said means for controlling growth include measuring devices adapted to measure at least one of a height, a density, and a water stress of the crops with respect to the ground.

3. The plant according to claim 2, wherein said measuring devices comprise a plurality of laser rangefinders associated with scanning devices configured to scan the rays emitted by said plurality of laser rangefinders in the direction of the ground, the plurality of laser rangefinders being arranged at a height and in a predetermined position with respect to the ground where the plant is installed and where the crops to be monitored are present.

4. The plant according to claim 1, wherein at least part of the energy generated by the plant is used to power at least one of the plurality of laser rangefinders or the scanning devices.

5. The plant according to claim 3, wherein said scanning devices are associated with the movement system of the electricity generation devices which allows movement on the first axis and on the second axis, of each of the plurality of laser rangefinders.

6. The plant according to claim 5, wherein said plurality of panels of the electricity generation devices comprise photovoltaic panels.

7. The plant according to claim 6, wherein each of the plurality of laser rangefinders is installed on a predetermined panel so that a laser of each of the plurality of laser rangefinders points downward towards the ground.

8. The plant according to claim 7, wherein the measuring devices are configured to obtain said measurements by making the plurality of panels move at night.

9. The plant according to claim 1, wherein said second axis is substantially orthogonal to the first axis.

10. The plant according to claim 1, wherein said means for controlling the growth comprise fluorescence devices adapted to measure the fluorescence emitted by the aforesaid crops.

11. The plant according to claim 10, wherein said fluorescence devices comprise at least one illumination source for the crops and at least one sensor for detecting the fluorescence emitted by the aforesaid crops.

12. The plant according to claim 11, wherein said at least one illumination source emits light radiations between 400 and 650 nm.

13. The plant according to claim 11, wherein the at least one illumination source comprises two illumination sources associated with the sides of a photovoltaic panel of the plant in a lighting direction which forms an angle with the ground which varies with respect to a distance of the two illumination sources from the ground.

14. The plant according to claim 10, wherein said fluorescence devices are associated with the plurality of panels.

15. The plant according to claim 14, wherein said fluorescence devices are associated with the plurality of movement systems for moving the plurality of panels.

16. The plant according to claim 1, wherein said means for controlling growth comprise shading devices for generating shading in a specific zone of the cultivated land.

17. The plant according to claim 16, wherein said means for controlling growth comprise temperature variation devices adapted to measure temperature variations in said specific zone, said temperature variation devices further comprising at least one temperature sensor, at least one sensor of radiation reflected from said zone, and at least one sensor of solar radiation.

18. The plant according to claim 16, wherein the shading devices comprise at least one movable shading plate.

19. The plant according to claim 18, wherein the shading devices are associated with one or more of the plurality of panels.

20. The plant according to claim 19, wherein said plate is associated with an edge of at least one of said plurality of panels and said plate is configured to slide between a pair of guides formed on the at least one panel and be moved by an actuator.

21. The plant according to claim 20, wherein a temperature sensor is positioned adjacent to the plate.

22. The plant according to claim 1, wherein said means for controlling the growth comprise measuring devices configured to measure at least one of a height, a density, and a water stress of the crops, fluorescence devices configured to measure the fluorescence of the crops, shading devices configured to generate shading in a specific area of the cultivated land, and temperature variation devices configured to measure temperature variations in that specific area.

* * * * *